US012021951B2

(12) United States Patent
Garg et al.

(10) Patent No.: US 12,021,951 B2
(45) Date of Patent: *Jun. 25, 2024

(54) METHOD FOR RESOLVING DELIVERY PATH UNAVAILABILITY

(71) Applicant: Comcast Cable Communications, LLC, Philadelphia, PA (US)

(72) Inventors: Amit Garg, Delran, NJ (US); Tom Brown, West Chester, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,133

(22) Filed: Apr. 18, 2023

(65) Prior Publication Data

US 2023/0421668 A1  Dec. 28, 2023

Related U.S. Application Data

(63) Continuation of application No. 17/861,989, filed on Jul. 11, 2022, now Pat. No. 11,665,265, which is a continuation of application No. 16/219,220, filed on Dec. 13, 2018, now Pat. No. 11,412,072, which is a continuation of application No. 12/967,714, filed on Dec. 14, 2010, now Pat. No. 10,187,496.

(51) Int. Cl.
| | |
|---|---|
| *H04L 69/14* | (2022.01) |
| *H04L 65/612* | (2022.01) |
| *H04L 65/80* | (2022.01) |
| *H04L 67/568* | (2022.01) |
| *H04N 21/24* | (2011.01) |
| *H04N 21/433* | (2011.01) |
| *H04N 21/462* | (2011.01) |
| *H04N 21/472* | (2011.01) |
| *H04N 21/63* | (2011.01) |

(52) U.S. Cl.
CPC ............ *H04L 69/14* (2013.01); *H04L 65/612* (2022.05); *H04L 65/80* (2013.01); *H04L 67/568* (2022.05); *H04N 21/2402* (2013.01); *H04N 21/4334* (2013.01); *H04N 21/4622* (2013.01); *H04N 21/47202* (2013.01); *H04N 21/631* (2013.01)

(58) Field of Classification Search
CPC ............ H04N 21/4334; H04N 21/631; H04N 21/4622; H04N 21/47202; H04N 21/2402; H04L 65/612; H04L 69/14; H04L 67/568; H04L 65/80
See application file for complete search history.

(56) References Cited

U.S. PATENT DOCUMENTS

| | | |
|---|---|---|
| 6,112,076 A | 8/2000 | Goetz et al. |
| 6,424,624 B1 | 7/2002 | Galand et al. |
| 6,917,619 B1 | 7/2005 | Waldman |
| 6,956,834 B2 | 10/2005 | Stanwood et al. |
| 6,963,927 B1 | 11/2005 | Lee et al. |

(Continued)

*Primary Examiner* — Mahran Y Abu Roumi
(74) *Attorney, Agent, or Firm* — Banner & Witcoff, Ltd.

(57) ABSTRACT

An apparatus, system and method are disclosed for resolving bandwidth constriction using multiple bandwidths and/or multiple content delivery paths. The apparatus, system and method may include recording requested video content and/or delivering the recorded video content to resolve bandwidth constriction using alternate bandwidths or delivery paths.

33 Claims, 5 Drawing Sheets

(56) References Cited

U.S. PATENT DOCUMENTS

| | | | |
|---|---|---|---|
| 7,353,253 B1* | 4/2008 | Zhao | H04L 12/1868 709/204 |
| 7,738,375 B1 | 6/2010 | Vinokour et al. | |
| 7,778,180 B2 | 8/2010 | Shaikh et al. | |
| 7,823,179 B2 | 10/2010 | Liu et al. | |
| 8,116,317 B2 | 2/2012 | Zuberi | |
| 8,452,302 B2* | 5/2013 | Rahman | H04W 28/16 455/452.2 |
| 8,493,869 B2 | 7/2013 | Udupi et al. | |
| 8,495,689 B2 | 7/2013 | Cook et al. | |
| 8,547,981 B2 | 10/2013 | Wood | |
| 8,553,608 B2* | 10/2013 | Zhang | H04B 7/155 370/315 |
| 8,739,233 B2 | 5/2014 | Schlack | |
| 8,842,691 B2* | 9/2014 | Napierala | H04L 12/1877 370/477 |
| 11,057,655 B2* | 7/2021 | Brooks | H04N 21/2402 |
| 2002/0073172 A1 | 6/2002 | Armstrong et al. | |
| 2003/0174648 A1 | 9/2003 | Wang et al. | |
| 2004/0042479 A1* | 3/2004 | Epstein | H04L 47/15 370/432 |
| 2004/0071216 A1 | 4/2004 | Richardson et al. | |
| 2004/0111756 A1 | 6/2004 | Stuckman et al. | |
| 2005/0071882 A1* | 3/2005 | Rodriguez | H04N 21/2393 348/E7.071 |
| 2005/0081244 A1* | 4/2005 | Barrett | H04N 21/472 725/38 |
| 2005/0256969 A1 | 11/2005 | Yancey et al. | |
| 2005/0289619 A1 | 12/2005 | Melby | |
| 2006/0218604 A1 | 9/2006 | Riedl et al. | |
| 2006/0251419 A1 | 11/2006 | Zadikian et al. | |
| 2006/0268683 A1* | 11/2006 | Dhesikan | H04L 47/24 370/216 |
| 2006/0272012 A1 | 11/2006 | Wu | |
| 2007/0101370 A1 | 5/2007 | Calderwood | |
| 2007/0110394 A1* | 5/2007 | Yuasa | H04N 21/47214 386/230 |
| 2007/0157234 A1 | 7/2007 | Walker | |
| 2007/0177632 A1* | 8/2007 | Oz | H04N 21/2187 348/E7.071 |
| 2007/0186264 A1 | 8/2007 | Briggs | |
| 2007/0195715 A1 | 8/2007 | Yamano et al. | |
| 2007/0211636 A1 | 9/2007 | Bellur et al. | |
| 2007/0214279 A1* | 9/2007 | Choi | H04L 65/612 709/231 |
| 2008/0040767 A1 | 2/2008 | McCarthy et al. | |
| 2008/0080473 A1 | 4/2008 | Thubert et al. | |
| 2008/0133767 A1* | 6/2008 | Birrer | H04L 67/1063 709/231 |
| 2008/0192820 A1* | 8/2008 | Brooks | H04N 21/2385 348/E7.071 |
| 2008/0209491 A1 | 8/2008 | Hasek | |
| 2008/0216107 A1 | 9/2008 | Downey et al. | |
| 2008/0244667 A1 | 10/2008 | Osborne | |
| 2008/0285936 A1* | 11/2008 | Yampanis | H04N 21/4583 386/E5.002 |
| 2008/0313684 A1 | 12/2008 | Batalden et al. | |
| 2009/0028170 A1* | 1/2009 | Jiang | H04L 12/2898 370/406 |
| 2009/0049469 A1 | 2/2009 | Small et al. | |
| 2009/0083813 A1* | 3/2009 | Dolce | H04N 7/17318 725/93 |
| 2009/0100459 A1* | 4/2009 | Riedl | H04N 21/2405 725/35 |
| 2009/0116379 A1* | 5/2009 | Rahman | H04N 21/26216 725/87 |
| 2009/0147718 A1* | 6/2009 | Liu | H04L 47/15 370/312 |
| 2009/0162033 A1* | 6/2009 | Del Sordo | H04N 21/47202 386/326 |
| 2009/0165043 A1 | 6/2009 | Ou et al. | |
| 2009/0168679 A1 | 7/2009 | Benjamim et al. | |
| 2009/0238074 A1* | 9/2009 | Vasseur | H04L 45/24 370/237 |
| 2009/0268605 A1* | 10/2009 | Campbell | H04L 45/123 370/254 |
| 2009/0313317 A1* | 12/2009 | Srikant | H04L 65/61 709/202 |
| 2010/0005499 A1 | 1/2010 | Covey | |
| 2010/0071007 A1 | 3/2010 | Meijer | |
| 2010/0074270 A1 | 3/2010 | Napierala | |
| 2010/0086020 A1 | 4/2010 | Schlack | |
| 2010/0095347 A1 | 4/2010 | Chase | |
| 2010/0131650 A1* | 5/2010 | Pok | H04L 47/263 709/226 |
| 2010/0131995 A1* | 5/2010 | Guo | H04N 21/4334 725/94 |
| 2010/0142477 A1 | 6/2010 | Yokota | |
| 2010/0174740 A1 | 7/2010 | Ge | |
| 2011/0055347 A1* | 3/2011 | Hu | H04N 21/6125 709/217 |
| 2011/0058490 A1 | 3/2011 | Mills et al. | |
| 2011/0072474 A1 | 3/2011 | Springer et al. | |
| 2011/0119703 A1* | 5/2011 | Schlack | H04N 21/6405 725/35 |
| 2011/0126247 A1 | 5/2011 | Howarter et al. | |
| 2011/0138064 A1* | 6/2011 | Rieger | G06F 16/9577 707/715 |
| 2011/0145869 A1 | 6/2011 | Rahman | |
| 2011/0145870 A1* | 6/2011 | Ramaswami | H04N 21/438 725/98 |
| 2011/0162013 A1 | 6/2011 | Bagasra et al. | |
| 2011/0231661 A1* | 9/2011 | Ramakrishnan | H04L 67/104 709/206 |
| 2011/0301912 A1* | 12/2011 | Pandey | H04W 64/00 702/150 |
| 2011/0302276 A1* | 12/2011 | Karaoguz | H04L 12/2838 709/219 |
| 2012/0023535 A1* | 1/2012 | Brooks | H04N 21/64322 725/110 |
| 2012/0066729 A1* | 3/2012 | Zou | H04L 12/2885 725/93 |
| 2012/0117264 A1* | 5/2012 | Zuberi | H04L 47/20 709/231 |
| 2012/0185906 A1 | 7/2012 | Doets et al. | |
| 2012/0284756 A1 | 11/2012 | Kotecha et al. | |
| 2012/0291083 A1* | 11/2012 | White | H04N 21/6408 725/111 |
| 2013/0003717 A1 | 1/2013 | Karaoguz et al. | |
| 2016/0203300 A1* | 7/2016 | Hu | H04N 21/6175 713/171 |
| 2016/0255378 A1 | 9/2016 | Brooks et al. | |
| 2017/0149923 A1 | 5/2017 | Heller et al. | |
| 2022/0239957 A1* | 7/2022 | Hu | H04N 21/4788 |

* cited by examiner

METHOD FOR RESOLVING DELIVERY PATH UNAVAILABILITY

CROSS-REFERENCE TO RELATED APPLICATIONS

This application is a continuation of U.S. application Ser. No. 17/861,989 filed Jul. 11, 2022 which is a continuation of U.S. application Ser. No. 16/219,220 filed Dec. 13, 2018 (now U.S. Pat. No. 11,412,072), which is a continuation of U.S. application Ser. No. 12/967,714 filed Dec. 14, 2010 (now U.S. Pat. No. 10,187,496), each of which is hereby incorporated by reference in its entirety.

FIELD OF THE DISCLOSURE

The present disclosure relates to content delivery, and, more particularly, to resolving bandwidth constriction using multiple bandwidths and/or multiple content delivery paths.

BACKGROUND

Content available for viewing typically comprises a file resident on a server remote from the viewer. For content such as Video on Demand (VoD), particular video content is requested, obtained from the remote server and streamed, such as via one or more real time streaming servers, over a network to the requesting user.

A VoD server may stream video content to a user to allow viewing in real time. The user may receive the streamed video content on a device associated with the user, such as a display device, digital video recorder (DVR), a personal video recorder (PVR), a settop box (STB), or a portable media player, for example, for viewing at any time. Providers offer VoD real time streaming, such as pay-per-view wherein a user buys or selects content in the form of a movie or television program that begins to play almost instantaneously, and VoD downloading, such as to a DVR, for viewing or using of the downloaded content at that time or in the future.

For VOD-type content, download and streaming may provide the user with a subset of functionality, such as functionality typically associated with VCR or DVD players, hereinafter referred to as VCR functionality. As used herein, VCR functionality may include pause, fast forward, fast rewind, slow forward, slow rewind, and jump to previous/future frame, for example. For VoD streaming systems that store and stream programs from at least one hard disk drive, VCR functionality may require additional processing and storage, in part because separate files for fast forward and rewind must be stored. On the other hand, memory-based VoD streaming systems may perform VCR functionality directly from a local memory, such a local RAM.

At least one server, such as a video server, may typically be located at a central location of a provider, such as a control or distribution center. The central location typically serves a particular market, and larger markets may employ hubs in conjunction with the central location server(s). Delivery of the content from the central location may ultimately be to a device at a user's premise. Communicatively coupled between the central location and the user's premise device(s) may be one or more intermediate servers, often referred to as edge servers, which may operate as infrastructure nodes.

An edge server may be configured to operate as a gateway to multiple end user devices, for example. An edge server may include storage suitable to save information to be provided to end user devices, including, but not limited to, content such as television shows, movies, advertisements and the like.

A distribution network extending from the central location, through, for example, other networks, one or more gateways, and/or one or more edge servers to one or more end user devices, may include bandwidth monitors, regional servers and/or other necessary or desired servers and distribution components, as would be understood by those possessing an ordinary skill in the pertinent arts. The distribution network may also include a vault server, such as in association with the central location, which may store the majority of, or all of, the titles available, although other copies of titles may be stored in other locations. For example, titles in use locally may be stored on a local edge server, and titles used on several edge servers may be stored at a gateway. The vault server may comprise a single server with a large volume of computerized storage, or a multitude of servers that work together to maintain copies of each title.

A switched digital video (SDV) system is a content distribution system that may, at least in part, be employed on the distribution network discussed herein. SDV delivers only content that is requested by a user. For example, only the channels or content that are requested by a user may be delivered from an edge server to the requesting user. This is in contrast to, for example, non-switched video where all channels/content may be delivered from the edge server to all users associated with the edge server. SDV thus enables conservation of bandwidth in that only the bandwidth associated with requested content is used.

In periods of high demand, a request for SDV content, or for VoD content, may be denied due to bandwidth and other distribution network-related limitations. Current remedies for such problems generally result in denial of the request. Such denial is sought to be prevented by content providers.

Thus, there exists a need for a solution that resolves bandwidth constriction that may prevent fulfilling a user request for delivery of content.

SUMMARY OF THE DISCLOSURE

The present disclosure relates to resolving bandwidth constriction using multiple allocated bandwidths within a single delivery path, and also to multiple allocated bandwidths using multiple content delivery paths. The disclosure relates to an apparatus, system and method for increasing effectiveness of delivery of content, such as data content and video content, such as for VoD or SDV, for example. During periods of insufficient bandwidth for delivery of requested content, a message may be delivered allowing the requested content to be stored, such as at a network DVR, for viewing at a later or relatively contemporaneous point in time over the same or over a different bandwidth (or portion thereof) than the bandwidth (or portion thereof) subjected to the request.

The disclosed apparatus, system and method resolve bandwidth constriction using multiple content delivery paths by receiving a request for content and/or monitoring available bandwidth for delivery of the content. Upon encountering a bandwidth constriction, the requester of the content may be queried about recording, and based on an affirmative acknowledgment of the query, the requested content may be recorded. The bandwidth constriction may be resolved, for example, by delivering the video content, such as when it is determined that available bandwidth exists for the delivery, for example.

In one aspect, when there is insufficient bandwidth to deliver the requested data and/or video content, a message may be delivered to the requester giving the option to have the requested content recorded, on a network DVR, for example, for viewing later, or with a certain time delay, or using an alternate delivery bandwidth. When there is a constriction during a request for data and/or video content, the requester may optionally receive an alert when the bandwidth limitation subsides, at which time the requester may elect to view the requested content. To view the requested content, the requester may make a single click on the alert, for example.

In another aspect, when bandwidth limitation may occur with respect to SDV allocated bandwidth, delivery of the content may occur in substantially real time, such as via VoD allocated bandwidth. Likewise, when there is bandwidth limitation with respect to VoD allocated bandwidth, substantially real time delivery of the requested content may be made via the SDV allocated bandwidth. In each case, an alert may be generated proposing a solution to the bandwidth constriction, and/or when the bandwidth necessary for delivery of the requested content becomes available. The alert may be sent to the requester of the content, such as to a device at a requestor's premises, or to a mobile device. The alert may be a message shown on a television, for example. The requested content may be played, for example, following a single click acknowledgement on a banner associated with the alert.

In these other aspects, the disclosure provides a solution that resolves bandwidth constriction that may prevent fulfilling a request for data and/or video content.

BRIEF DESCRIPTION OF THE FIGURES

Understanding of the disclosure will be facilitated by consideration of the following detailed description taken in conjunction with the accompanying drawings, in which like numerals refer to like parts.

DETAILED DESCRIPTION

Figure 1A:
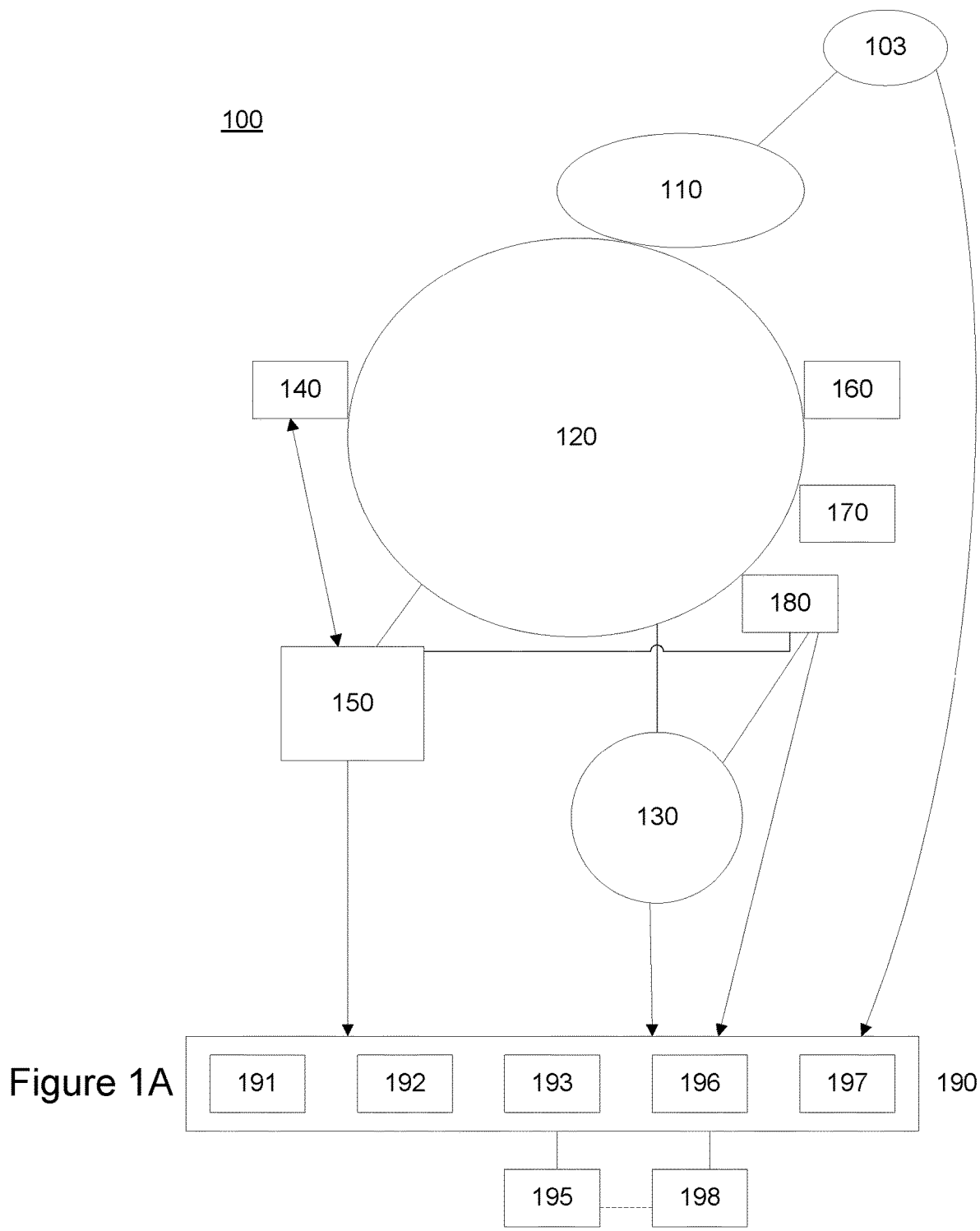
FIG. 1A depicts an exemplary architecture for content delivery.

It is to be understood that the figures and descriptions have been simplified to illustrate elements that are relevant for an understanding, while eliminating, for the purpose of brevity, many other elements found in content delivery systems and methods. Those of ordinary skill in the art may recognize that other elements and/or steps may be desirable and/or required in implementing the disclosure. The disclosure herein is also directed to all such variations and modifications to such elements and methods known to those skilled in the art.

The disclosure relates to increasing the effectiveness of delivery of content, such as VoD or SDV type delivery, for example. As used herein, content refers to data and/or video content, or any other type of content. During periods when insufficient bandwidth exists to deliver requested content, and/or where there is a more desirable delivery methodology, a message may be delivered to a user with an option for allowing the requested content to be stored. Such storage may be implemented by recording on a network DVR (nDVR), for example, as discussed in more detail below. The stored content may then be viewed at a later time, or at a relatively contemporaneous point in time.

While the disclosure herein describes, by way of example, constriction with respect to VoD and SDV allocated bandwidth, and delivery of content using SDV and VoD allocated bandwidth, respectively, the disclosure is likewise applicable to overcome bandwidth constriction when delivering content via other methodologies.

For example, content requested for delivery over SDV or VoD allocated bandwidth in a single delivery path, for example, may be interchangeably delivered via a packet switched network such as the internet, such as by delivering IP packets via a high speed internet connection, in light of the discussion herein. Content delivered via a packet switched network internet allocated bandwidth may be viewed using a display device, or a display device interconnected to another device such as a settop box, for example. A display device connected to the internet, for example, may include a wireless handheld device, a laptop or personal computer, for example. Other delivery bandwidth available to overcome bandwidth constrictions may include an Ethernet or 802.11 connection, by way of non-limiting example.

A message may be initiated upon encountering insufficient bandwidth to deliver requested content, wherein the message may query whether to record the requested content on a network DVR (nDVR), for example. In some instances, such as when the constriction is with respect to VoD type delivery, the requester may optionally receive an alert when the bandwidth limitation subsides, at which time the requester may elect to view the requested content. Additionally, the message, or another message, may query as to whether delivery of the requested content over alternate, non-constricted bandwidth, is acceptable. To view the requested content, the requester may optionally play the requested content by, for example, a single click on the alert message.

In one aspect, if the bandwidth limitation occurs with respect to the SDV allocated bandwidth, delivery of the content may occur in substantially real time, via the VoD allocated bandwidth, for example. In such a case, an nDVR or other device may serve as a switch that records the requested SDV content and that contemporaneously switches the content to be played on the VoD allocated bandwidth. Of course, other hardware and/or software elements within a network, such as a central processing location (e.g., headend), gateway servers, or edge servers, or the operating systems thereof as discussed herein, may be used to perform this switching. Alternatively, the requesting user may be given an option to view the content over the requested allocated bandwidth, but at a later time, such as after recording at the switch/nDVR. For example, when the bandwidth limitation is with respect to VoD, an alert may be generated when the VoD allocated bandwidth necessary for delivery of the requested VoD content becomes available.

An alert may be sent to a user, such as to the device used by the user to request the content, or to another device. The alert may be a banner-type message, for example, displayed on a screen of the requesting device or a screen communicatively connected to the requesting device, alerting the user to the proposed alternate delivery for the content and/or indicating that the requested content is available. The alert may also take the form of an email, a specified display, a phone call, SMS or MMS message, or other prompt recognizable to a user, for example. The requested content may, in some embodiments, be played by, for example, a single click acknowledgement on a message associated with the alert.

Referring now to FIG. 1A, there is shown an exemplary content delivery system 100. As shown in FIG. 1A, system 100 may include a vault server 110, a regional network 120, such as a converged regional area network (CRAN), and on SDV system 130, having an associated SDV allocated bandwidth. Also shown is nDVR 140, and VoD system 150, having an associated VoD allocated bandwidth. Any number of regional networks 120 may be included in delivery system 100, although one regional network 120 is illustratively shown in FIG. 1A. Similarly, any number of vault servers 110 may be included in the delivery system 100. Likewise, any number of SDV system 130 and VoD system 150 may be employed. A single nDVR 140 is shown in FIG. 1A, although multiple nDVR may be interconnected, functioning as a single unit or operating distinctly. Vault server 110 may be located at a provider's central processing facility 103 of delivery system 100, and may be communicatively connected to regional network 120.

Communicatively interconnected with regional network 120 may be one or more gateway servers 160, one or more edge servers 170 and one or more hub edge QAMs 180 (for systems employing such devices). Interconnected with hub edge QAM 180 and/or edge server 170 may be one or more end user devices 190, such as content receivers, local gateways or STBs, for example. Regional network 120 and/or vault server 110 may have communicatively connected thereto nDVR 140, for example.

The delivery of content from edge server 170 to user devices 190 may be by SDV system 130. VOD system 150 may also deliver content from a dedicated device such as an edge server 170, or any other dedicated or shared device, to user device 190. SDV system 130 and VoD system 150 may share bandwidth for distribution of content to user devices 190, or may have distinct bandwidth allocations.

Vault server 110 may contain content available for request. Vault server 110 may, for example, contain or store all of the available titles for content delivery system 100. Vault server 110 may be configured to monitor delivery system 100, and may provide distribution information and monitor statistics associated with one or more user devices 190 and/or end users 198.

Regional network 120 may be any network that can carry voice, video or data. Regional network 120 may allow voice, video and data, such as Internet traffic, over a single network, and may be enhanced with redundant networks. Regional network 120 may connect to a delivery backbone and may include distribution components, and gateways, routers, servers and switches, for example, as would be understood by those possessing an ordinary skill in the pertinent arts.

SDV system 130 may transmit or distribute content, such as digital video and may include one or more SDV servers. SDV system 130 takes advantage of the fact that only a percentage of user devices 190 actively watch certain content at any given time, and thus rarely if ever are all channels accessed by all user devices 190. SDV system 130 may thus send actively viewed digital video to user devices 190, in order to conserve bandwidth and/or free bandwidth. SDV system 130 may be used in digital video distribution for various types of content distribution systems, such as, for example, systems using QAM, and/or Internet Protocol television (IPTV) systems. IPTV systems may deliver digital television using Internet Protocol over a packet-switched network infrastructure, such as the Internet or like broadband access, rather than delivering through traditional radio frequency broadcast and television formats.

SDV system 130 may reduce bandwidth consumption by delivering only requested channels, that is, delivery of only those channels requested by users of delivery system 100 and/or SDV system 130, as discussed hereinabove. As such, an exemplary bandwidth allotment for SDV system 130 may take into account only those channels that are requested. Bandwidth allocation for SDV system 130 may be based on the number of homes served, number of user devices served, time of day, day of the week, and like factors, for example. Bandwidth allocation for SDV system 130 may, at any given time, be a fixed allocation or an allocation within predetermined limits, and thus a bandwidth limitation or constriction may arise despite the advantages provided by SDV. For example, such a bandwidth limitation would arise if an SDV system 130 channel were requested, but if available bandwidth was insufficient to deliver the requested channel.

An nDVR 140, which may also be referred to as remote storage digital video recorder (RS-DVR), is a digital video recorder that provides content storage at a location communicatively connected to the regional network 120. Traditionally, content may be stored in user device's 190 hard drive, but nDVR 140 may provide a much larger volume of storage comprising many servers, including vault, gateway and/or edge servers, for the requested content.

VoD system 150 may stream content to user devices 190 and may include one or more VoD servers. VoD system 150 may allow content viewing in real time, or allow content to be downloaded to a device, such as a computer, digital video recorder, personal video recorder or portable media player, for example, for viewing at any time. The majority of providers offer VoD streaming, such as pay-per-view, in which a user buys or selects a movie or television program and may begin to play the content on a television semi-instantaneously, and/or VoD downloading, such as to download requested content to a DVR for viewing in the immediate or more distant future.

User device 190 may connect display device 195 and an external source of signal, and may render the received external signal into content for display on the television. User device 190 may modulate data for upstream transmission and may demodulate received data for subsequent display for user 198. User device 190 may be coupled to and/or incorporate display device 195, which display device 195 may be capable of rendering the signals received by user device 190 for display to user 198. User device 190 may receive external signals from edge servers 170 and/or hub edge QAM 180, for example. User device 190 may provide interactivity, such as wherein user 198 may send a signal into system 100 using user device 190, and may provide bidirectional communication, for example, such as between user 198 and content system 100. User 198, as used herein, is one who interacts with user device 190, including but not limited to controlling user device 190. User 198 may identify herself or himself to the system using an account, such as a user account or a username and password, for example. In some aspects, user 198 may access system 100 without an account.

User devices 190 may be of different types, such as types based on the transmission path for delivery of content to user 198. For example, user device 190 may be a settop box 191. Settop box 191 may modulate data for transmission and may demodulate received data for display to user 198. Settop box 191 may be coupled to and/or incorporate a display device 195, which may be capable of rendering received signals for display to user 198. Settop box 191 may operate using bidirectional communication, meaning settop box 191 may enable user 198 to interact with system 100. Bidirectional communication may allow user 198 to select alternative delivery paths in the event of a bandwidth constriction, and/or may allow system 100 to notify user 198 of a bandwidth constriction and/or offer alternate delivery path(s).

User device 190 may also be tuner 192 within display device 195, for example. Tuner 192 may modulate data for transmission and may demodulate received data for subsequent display to user 198. Tuner 192 may provide bidirectional communication, for example, such as between user 198 and content system 100, which communication may allow user 198 to select alternative delivery paths and/or may allow content system 100 to notify user 198 of a constriction.

User device 190 may be IPTV 193. IPTV 193 may perform signal processing on data for transmission and received data. IPTV 193 may be integral with and/or include display device 195. IPTV 193 may operate using bidirectional communication to thereby enable user 198 to interact with systems that deliver content.

User device 190 may be mobile device 196. Mobile device 196 may operate in a receive-only mode, such due to bandwidth constraints in transmitting content wirelessly, and therefore may enable user 198 to receive content from, but not enable user 198 to interact with, systems that deliver content.

User device 190 may be computer 197. Computer 197 may operate in a receive-only mode, such as due to bandwidth constraints in transmitting content over computer networks, and therefore may not enable a user 198 to interact with systems that deliver content.

Those skilled in the art will appreciate that user device 190 may include other types of devices, such as landline telephones, satellite receivers and broadband receivers, for example. In accordance with the disclosure, such devices are associated with display device 195 for generating a display of requested content to user 198, and may operate bidirectionally, or in receive-only mode, as discussed with respect to the examples above.

A single request, or multiple requests, from a user may go unfulfilled if bandwidth allocation constricts delivery of requested content over a requested communication path, such as over SDV system 130 or VoD system 150, to the requesting user device 190 or an alternate user device 190. In order to alleviate such a bandwidth constriction, multiple bandwidth tiers, or alternate content paths, may be provided. For example, in one alternate path, nDVR 140 may record the requested content, such as with appropriate identification to ensure appropriate delivery. Such identification may include, for example, meta data containing information identifying the requested content, user 198, requesting user device 190, other user devices 190 of the requesting user 198, and/or preferred delivery path and time.

An nDVR 140 may record the requested content for later delivery over the bandwidth allocated to the requested delivery path, or may serve as a bandwidth switch to contemporaneously or later deliver the requested content over an alternate delivery path. For example, once the recording of requested SDV content by nDVR 140 begins, delivery of the recorded, requested SDV content may fall to a later time and be over the bandwidth allocation of SDV system 130. Alternatively, delivery of the requested SDV content may, if the SDV allocated bandwidth is constricted, be switched by nDVR 140 for contemporaneous delivery over the VoD allocated bandwidth of VoD system 150. Effectively, this may eliminate the bandwidth constriction, at least insofar as a particular user is concerned, because the user may thus receive the requested content.

Central facility 103 may be communicatively coupled to vault server 110, and may control vault server 110. Central facility 103 may receive content signals, such as audiovisual content signals, from a myriad of sources, may process the received signals, and may distribute the processed signals over a provider network. Central facility 103 may be a head-end within a network, for example. A central facility, as used herein, may include any facility for receiving content signals, and for processing and distributing received signals over a provider's network(s). While central facility 103 is depicted independently from vault server 110, these elements may be combined.

Central facility 103 may verify, establish and/or identify additional paths for distribution of requested content. Central facility 103 may include verification techniques to identify additional content delivery paths, such as by searching a database registration of system users, including interrelations of internet, television and phone users, for example. Such database registration may be used to identify an appropriate alternative path over which requested content may be delivered.

Central facility 103 may be interconnected to regional area network 120, such as via vault server 110, as discussed above. Central facility 103 may also be interconnected, such as via a broadband path that may or may not include end user device 190, such as computer 197, for example, to display device 195, such as a display for a laptop, personal computer or mobile device, for example. The interconnection to display device 195 may take the form of web connectivity or a similar communicative coupling, such as a wired or wireless coupling. For example, when a customer requests content, such as VoD content or an SDV channel, and bandwidth constraints prevent delivery of the requested content, alternative delivery paths for providing content to a user, such as those including display device 195, may be determined by central facility 103.

Figure 1B:
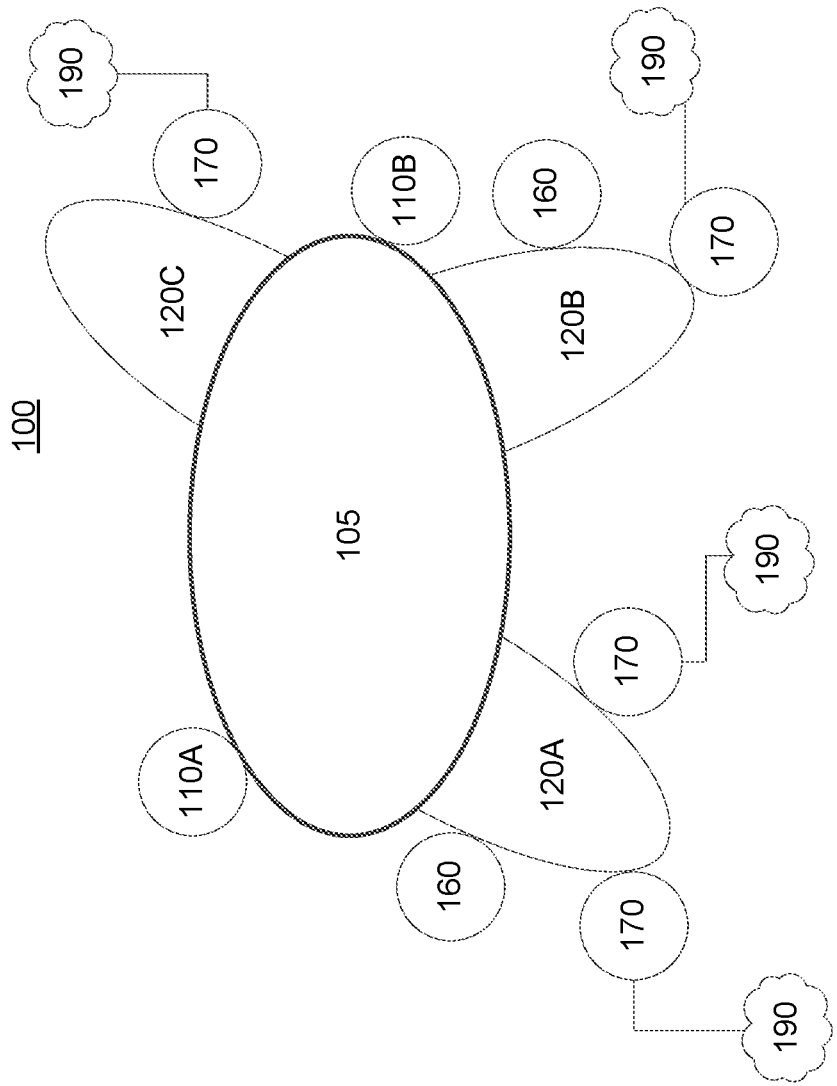
FIG. 1B depicts an exemplary architecture for content delivery.

Referring now to FIG. 1B, there is shown another exemplary content delivery system 100. In the illustrated embodiment, system 100 may include multiple vault servers 110a and 110b communicatively connected, such as via a delivery backbone 105, to a series of regional networks 120a, 120b, and 120c. Communicatively coupled to regional network 120a may be gateway server(s) 160, and edge servers 170. Each of edge servers 170 may be uniquely communicatively coupled to at least one user device 190.

Transmission of content may include delivery of certain content across backbone 105, through regional network(s) 120, to end user devices 190, such as via edge server 170. Similarly, multicasting may occur across backbone 105 and regional network(s) 120, such as through edge server 170, to end user devices 190 that request the multicast content. On the other hand, unicasting may deliver content specifically requested by a unique end user or device 190 only to that requesting end user or device 190.

Figure 1C:
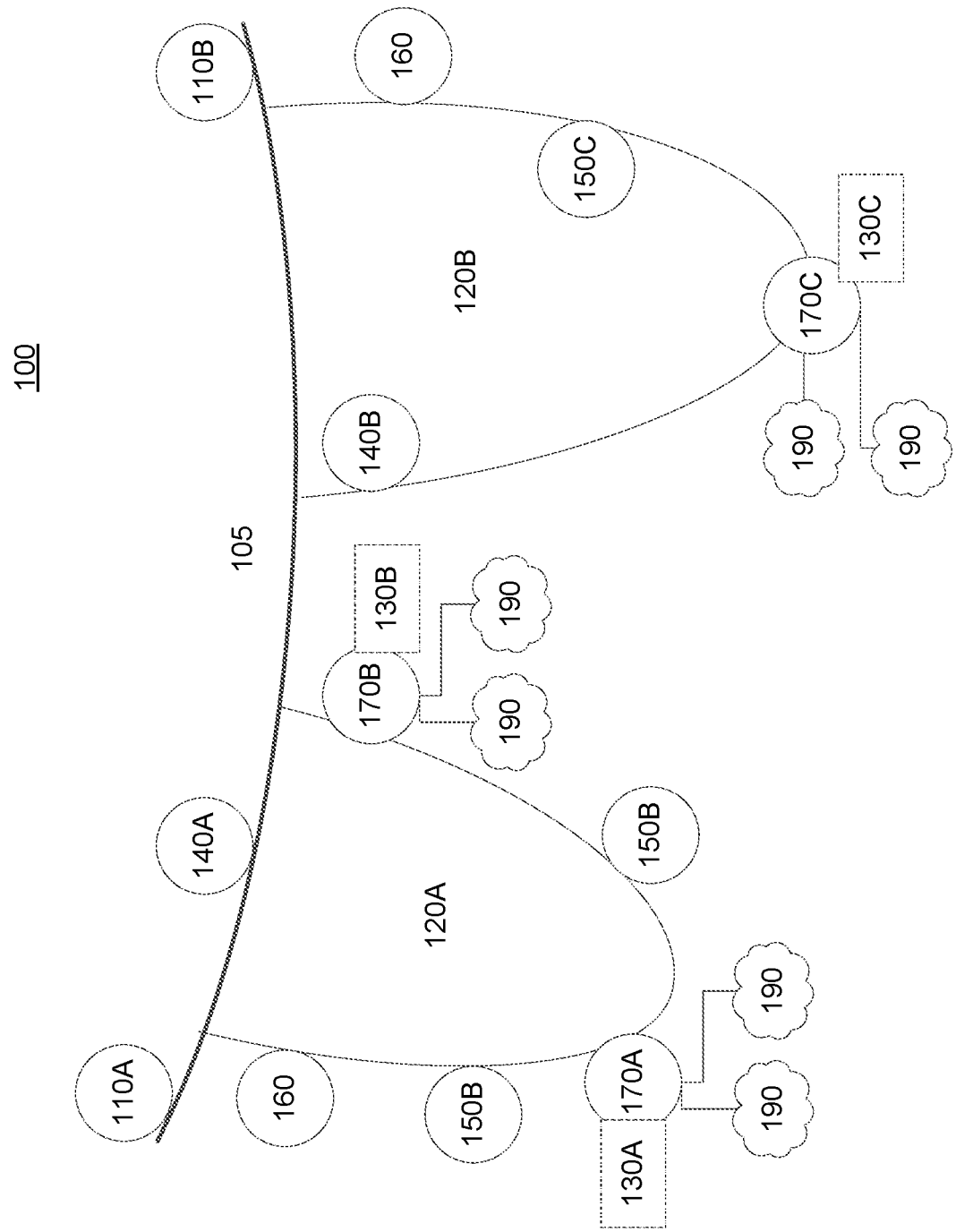
FIG. 1C depicts an exemplary architecture for content delivery.

Referring now to FIG. 1C, there is shown another exemplary content delivery system 100. System 100 may include vault servers 110a and 110b, communicatively coupled via backbone 105 to regional networks 120a and 120b. Communicatively coupled to backbone 105 and/or regional networks 120a and 120b may be nDVRs 140a and 140b, respectively. Communicatively coupled to regional network 120a may be gateway server 160, a plurality of VoD servers 150a and 150b, and edge servers 170a and 170b. Each edge server 170 may be uniquely communicatively coupled to at least one user device 190. Associated with each edge server 170 may be SDV system 130, illustrated as edge server 170*a* and associated SDV server 130*a*, and edge server 170*b* and associated SDV server 130*b*. Regional network 120*b* may be configured similarly to regional network 120*a*, with interconnectivity to gateway server 160, VoD server 150*c*, and edge server 170*c* with associated SDV server 130*c*.

SDV, which may be multicast as discussed above, provides content to users who desire the content at the same time, thereby providing linear television. SDV system 130 may maintain and transmit a listing of content available to user device 190, and the required tuning information to access the content. In the event that end user device 190 requests content that is not presently being transmitted, end user device 190 may signal representative SDV system 130, requesting the specific content. SDV system 130 may interface edge server 170 to identify the requested channel frequency. SDV system 130 may configure an available frequency on which to deliver the requested content to the requesting end user device 190, and may transport the content using that frequency.

VoD, which may be unicast as discussed above, provides content non-linearly to a single end user device 190. When end user device 190 requests VoD content, VoD system 150 locates that specific content and negotiates parameters for the delivery of that specific content to the requesting end user device 190.

A configuration file for an end user device 190 may be delivered in accordance with an applicable protocol or specification. The configuration file may describe, among other things, a specific output channel lineup mapping for an input channel source and tuner frequency assignment. The configuration file may thereby indicate, such as through the use of in band and out of band messaging data, the desired conversion of input channel map information to the output channel lineup. The desired conversion may indicate the delivery frequency and/or location in a delivered data stream of the output channel lineup for VoD content and SDV channels, for example.

The channel mapping may, for example, indicate the Electronic Industries Association (EIA) output channel correspondent to a particular source identification (ID), such as VoD system 150 or SDV system 130.

Additionally, an auxiliary output channel map may be used to map auxiliary input identification(s) to an EIA channel number. Such auxiliary input identifications may also include, for example, VoD system 150 and/or SDV system 130.

Figure 2:
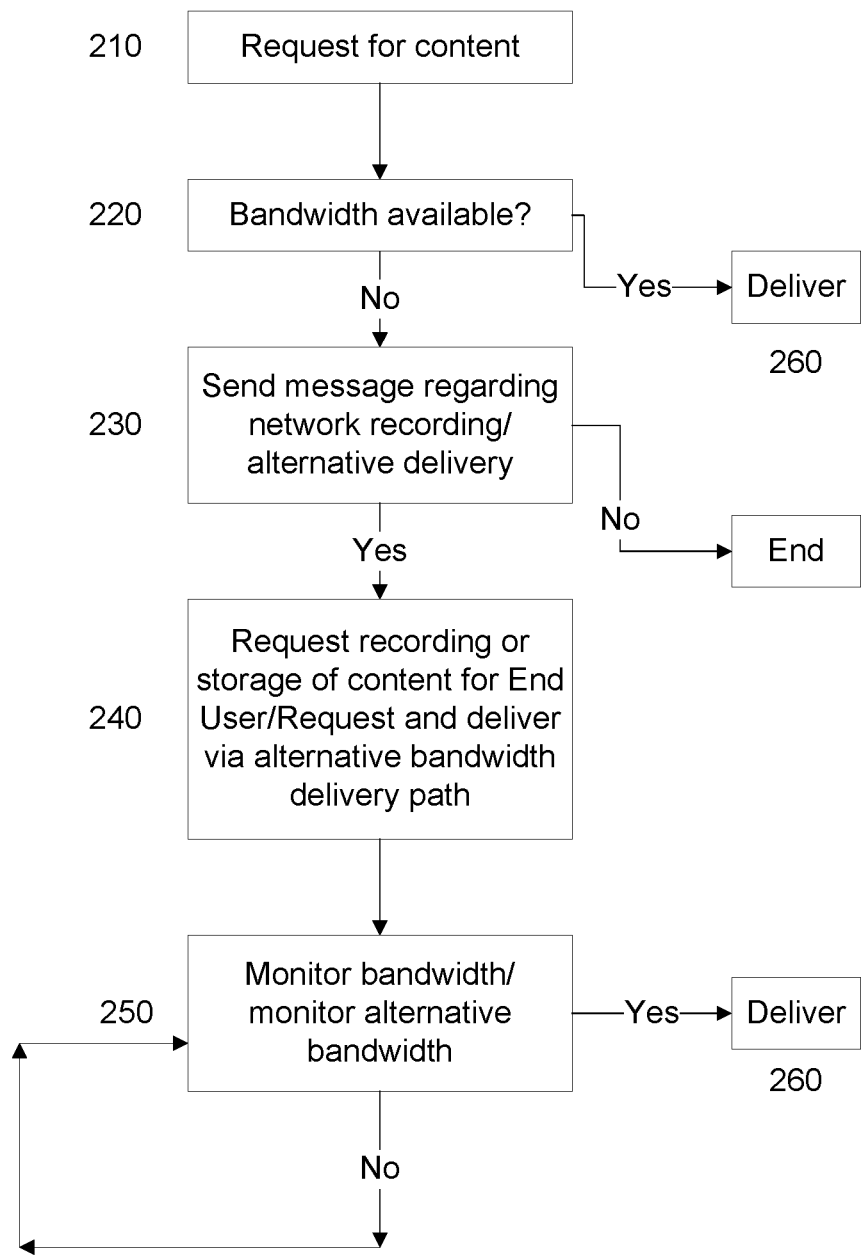
FIG. 2 shows a method in accordance with aspects of the disclosure.

Referring now to FIG. 2, there is shown a flow diagram of an example content delivery method 200. As illustrated, the method of content delivery may include recording requested content on an nDVR. The method may include receiving a request for content at step 210, such as from a user via a user device. Available bandwidth may be monitored, or specifically checked, at step 220 for delivery of the requested content. If the necessary bandwidth for delivery is available, the requested content may be delivered at step 260, such as through the use of VoD or SDV allocated bandwidth. If the necessary bandwidth for delivery of the requested content is not available over the requested delivery path, a message may be sent, such as from a provider, for example, providing the requester the option of recording the content, such as on a nDVR, for later delivery over the requested or an alternate delivery path, or for contemporaneous delivery over an alternate delivery path, at step 230. The message may be sent from a hardware or software device interoperably connected to a content delivery network, and to a user device, for prompting a user to respond to a message.

The message of step 230 may state that the delivery system is under heavy load, and/or may provide a time expectation of when the load is expected to subside. Such heavy loads are typically transient, and thus may last only a very short time, such as on the order of a minute to a few minutes. Of course, method 200 may be carried out without providing a message at step 230 and by instead carrying out a proposed alternate delivery solution without informing the requesting user, for example.

If the content is to be recorded on the nDVR, such as pursuant to a response to a message, a request may be sent to the nDVR to record the content for an identified user or an associated device at step 240. Further, available bandwidth may be monitored at step 250, continually or discretely at intervals, such as every minute, for example, and if available bandwidth becomes sufficient along the requested delivery path or along an alternate delivery path for delivery of the requested content, the requested content may be delivered at step 260.

For example, a SDV allocated channel that is unavailable due to bandwidth constriction within the SDV allocated bandwidth may be delivered by utilizing the method 200 by switching, such as by a device at the central processing office, of the requested SDV channel from the SDV bandwidth allocation to the VoD bandwidth allocation. A switch to the VoD allocated bandwidth may comprise switching to the bandwidth allotted to the VoD source identification in the channel mapping, as discussed hereinabove, for example. The SDV channel may be recorded by an nDVR and, once the recording starts, the nDVR may execute a switch to the VoD allocated bandwidth to deliver the requested SDV channel. For example, at step 230, the message sent to a user may ask whether an alternative delivery is acceptable. At step 240 the alternate bandwidth may be reserved, and the method provides for the delivery of the SDV channel via the VOD allocated bandwidth in this example. At step 250, the alternate bandwidth, such as the VOD allocated bandwidth, may be monitored for delivery of the requested content, such as the SDV channel, which is delivered at step 260.

In method 200, the nDVR, for example, may operate as a switch that switches delivery from a constricted bandwidth, such as the SDV allocated bandwidth, to a non-constricted bandwidth, such as the VoD allocated bandwidth. Additional or other switches between other delivery paths may be similarly employed in method 200. For example switching may occur between wired or wireless television delivery paths, mobile networks, data networks, and packet switched networks such as the internet. Switches for switching content from the constricted bandwidth to available bandwidth may comprise hardware and/or software switches, and may include digital recorders, central facilities, servers, and the like.

By way of more particular example, a user may request a SDV channel, and it may be determined that there is insufficient bandwidth to play the requested SDV channel. A message may be sent to the user device of the requesting user to display a message, such as "Record in the Network for Future viewing." If the user chooses to record for future viewing, a request may be sent to an nDVR, identifying the user or device and the SDV channel requested, such that the nDVR can record the SDV channel. The nDVR may then record the content for the identified requester. In this example, if the bandwidth allocated for nDVR is managed independently of the bandwidth for SDV, the nDVR may give the user the option to start watching the requested content immediately, thereby avoiding the bandwidth limitation in the SDV.

Figure 3:
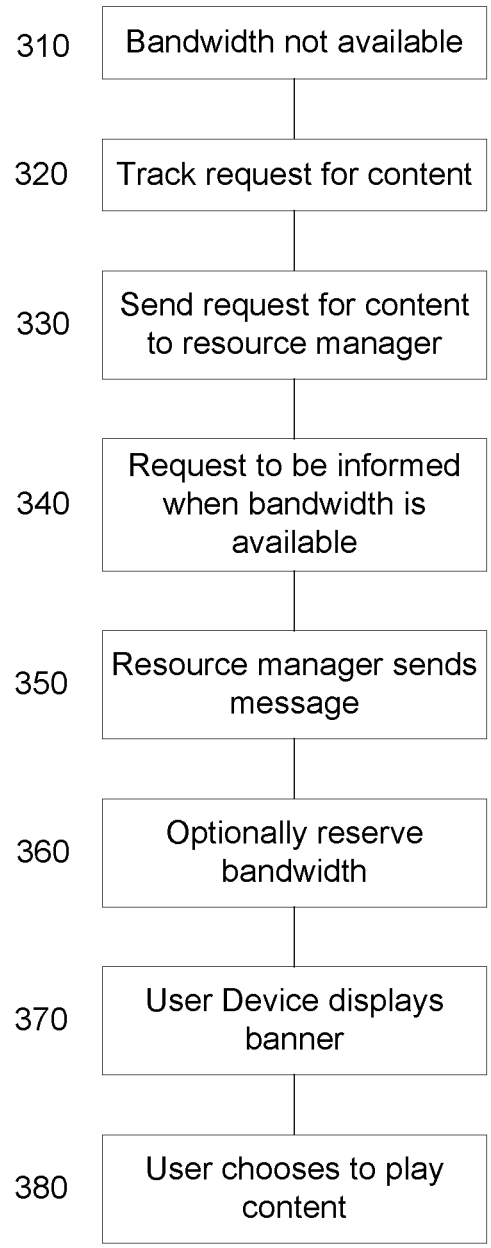
FIG. 3 shows another method in accordance with aspects of the disclosure.

Referring now to FIG. 3, there is shown a flow diagram of another content delivery method 300. As illustrated, if bandwidth is not available for delivery of requested content at step 310, a request for content may be tracked at step 320, and may be sent, such as in a message form, to an edge resource manager (ERM) at step 330. The request may initiate the system to track the availability of bandwidth, and may include a request to be informed when sufficient bandwidth becomes available, at step 340. The ERM may, for example, send a "bandwidth availability" message to the VoD systems at step 350. The VoD system may responsively reserve available bandwidth at step 360. Alternatively, bandwidth may not be reserved. If bandwidth is reserved, a release or allocation of the bandwidth may be configured. This reservation of available bandwidth may include an elapsed time timer, for example, that monitors the time that has elapsed since the reservation of the bandwidth. In the event that no use of the bandwidth has occurred during a predetermined amount of elapsed time, the reserved bandwidth may be released. Of course, other metrics may be used to cause the release of bandwidth, including but not limited to, overall bandwidth usage levels and subsequent requests by the content requester. In the case bandwidth is not reserved, the VoD may operate on a first come first served basis. In such a configuration, a lower threshold may be used to determine that bandwidth availability exists. For example, if the requested content is 3.75 Mbps and the total capacity of the VoD system is 37 Mbps, bandwidth may be assessed as available at any level of less than 30 Mbps.

Once bandwidth is available, the ERM may send a message to the requesting user device, or an associated device, to display a banner, for example, indicating that the requested content can then be viewed, at step 370. When the requester chooses to play the requested content, it may be played, such as by a single click without having to navigate a VoD menu, at step 380.

The methods described in FIGS. 2, 3, and other disclosed methods may be implemented via software stored on computer readable media that may be executed by a processor. Further, the steps and/or actions described in connection with the aspects disclosed herein may be embodied directly in hardware, in a software module executed by the processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from the storage medium. Alternatively, the storage medium may be integral to the processor. Further, in some aspects, the processor and the storage medium may reside in an ASIC. Alternatively, the processor and the storage medium may reside as discrete components. Additionally, in some aspects, the steps and/or actions of a method or algorithm may reside as one or any combination or set of instructions stored on a machine readable storage medium and/or a computer readable storage medium.

Although the disclosure has been described and pictured in an exemplary form with a certain degree of particularity, it is understood that the present disclosure has been made by way of example, and that numerous changes in the details of construction and combination and arrangement of parts and steps may be made without departing from the spirit and scope of the disclosure as set forth and of the claims hereinafter.

The invention claimed is:

1. A method comprising:
   receiving a request for content associated with a user device; and
   based on a determination that a first delivery path via a first computing device is unavailable for delivering the content to the user device, causing sending the content to the user device via a second computing device and via a wireless delivery path different from the first delivery path.

2. The method of claim 1, wherein the wireless delivery path is based on a first wireless technology, wherein the first delivery path comprises a second wireless delivery path, and wherein the second wireless delivery path is based on a second wireless technology different from the first wireless technology.

3. The method of claim 1, wherein at least one of the first delivery path or the wireless delivery path comprises one or more of:
   a satellite;
   a local area network;
   a packet switched network; or
   a mobile network.

4. The method of claim 1, wherein at least one of the first delivery path or the wireless delivery path comprises:
   a multicast delivery path; or
   a unicast delivery path.

5. The method of claim 1, wherein the causing sending via the wireless delivery path comprises causing sending the content to the user device via multicast delivery.

6. The method of claim 1, wherein the causing sending via the wireless delivery path comprises causing sending the content to the user device via unicast delivery.

7. The method of claim 1, further comprising determining that the first delivery path is unavailable by determining that there is insufficient bandwidth for delivery of the content via the first delivery path.

8. The method of claim 1, further comprising, based on the determination that the first delivery path is unavailable, causing sending a message, to the user device, indicating that the first delivery path is unavailable.

9. The method of claim 1, further comprising, based on the determination that the first delivery path is unavailable, causing sending a message, to the user device, allowing a user of the user device to select an alternative delivery path for delivering the content to the user device.

10. The method of claim 1, further comprising, based on the determination that the first delivery path is unavailable, causing sending a message, to the user device, allowing a user of the user device to select the wireless delivery path for delivering the content to the user device.

11. The method of claim 1, further comprising:
    receiving, from the user device, a message requesting delivery of the content via an alternative delivery path, wherein the causing sending is further based on the receiving the message.

12. The method of claim 1, further comprising, based on the determination that the first delivery path is unavailable, determining, from a database of preregistered alternative delivery paths, the wireless delivery path.

13. An apparatus comprising:
    one or more processors; and
    memory storing instructions that, when executed by the one or more processors, cause the apparatus to:

receive a request for content associated with a user device; and based on a determination that a first delivery path via a first computing device is unavailable for delivering the content to the user device, cause sending the content to the user device via a second computing device and via a wireless delivery path different from the first delivery path.

14. The apparatus of claim 13, wherein the wireless delivery path is based on a first wireless technology, wherein the first delivery path comprises a second wireless delivery path, and wherein the second wireless delivery path is based on a second wireless technology different from the first wireless technology.

15. The apparatus of claim 13, wherein at least one of the first delivery path or the wireless delivery path comprises one or more of:
   a satellite;
   a local area network;
   a packet switched network; or
   a mobile network.

16. The apparatus of claim 13, wherein at least one of the first delivery path or the wireless delivery path comprises:
   a multicast delivery path; or
   a unicast delivery path.

17. The apparatus of claim 13, wherein the instructions, when executed by the one or more processors, further cause the apparatus to cause sending the content to the user device via multicast delivery.

18. The apparatus of claim 13, wherein the instructions, when executed by the one or more processors, further cause the apparatus to cause sending the content to the user device via unicast delivery.

19. The apparatus of claim 13, wherein the instructions, when executed by the one or more processors, further cause the apparatus to determine that the first delivery path is unavailable by determining that there is insufficient bandwidth for delivery of the content via the first delivery path.

20. A non-transitory computer-readable medium storing instructions that, when executed, cause:
   receiving a request for content associated with a user device; and
   based on a determination that a first delivery path via a first computing device is unavailable for delivering the content to the user device, causing sending the content to the user device via a second computing device and via a wireless delivery path different from the first delivery path.

21. The non-transitory computer-readable medium of claim 20, wherein the wireless delivery path is based on a first wireless technology, wherein the first delivery path comprises a second wireless delivery path, and wherein the second wireless delivery path is based on a second wireless technology different from the first wireless technology.

22. The non-transitory computer-readable medium of claim 20, wherein at least one of the first delivery path or the wireless delivery path comprises one or more of:
   a satellite;
   a local area network;
   a packet switched network; or
   a mobile network.

23. The non-transitory computer-readable medium of claim 20, wherein at least one of the first delivery path or the wireless delivery path comprises:
   a multicast delivery path; or
   a unicast delivery path.

24. The non-transitory computer-readable medium of claim 20, wherein the causing sending via the wireless delivery path comprises causing sending the content to the user device via multicast delivery.

25. The non-transitory computer-readable medium of claim 20, wherein the causing sending via the wireless delivery path comprises causing sending the content to the user device via unicast delivery.

26. The non-transitory computer-readable medium of claim 20, wherein the instructions, when executed, further cause determining that the first delivery path is unavailable by determining that there is insufficient bandwidth for delivery of the content via the first delivery path.

27. A system comprising:
   a first computing device; and
   a user device,
   wherein the first computing device comprises:
      one or more first processors; and
      first memory storing first instructions that, when executed by the one or more first processors, cause the first computing device to:
         receive a request for content associated with the user device; and
         based on a determination that a first delivery path via a second computing device is unavailable for delivering the content to the user device, cause sending the content to the user device via a third computing device and via a wireless delivery path different from the first delivery path,
   wherein the user device comprises:
      one or more second processors; and
      second memory storing second instructions that, when executed by the one or more second processors, cause the user device to:
         receive the content from the third computing device.

28. The system of claim 27, wherein the wireless delivery path is based on a first wireless technology, wherein the first delivery path comprises a second wireless delivery path, and wherein the second wireless delivery path is based on a second wireless technology different from the first wireless technology.

29. The system of claim 27, wherein at least one of the first delivery path or the wireless delivery path comprises one or more of:
   a satellite;
   a local area network;
   a packet switched network; or
   a mobile network.

30. The system of claim 27, wherein at least one of the first delivery path or the wireless delivery path comprises:
   a multicast delivery path; or
   a unicast delivery path.

31. The system of claim 27, wherein the first instructions, when executed by the one or more first processors, further cause the first computing device to cause sending the content to the user device via multicast delivery.

32. The system of claim 27, wherein the first instructions, when executed by the one or more first processors, further cause the first computing device to cause sending the content to the user device via unicast delivery.

33. The system of claim 27, wherein the first instructions, when executed by the one or more first processors, further cause the first computing device to determine that the first delivery path is unavailable by determining that there is insufficient bandwidth for delivery of the content via the first delivery path.

* * * * *